United States Patent
Henning

(10) Patent No.: US 11,230,276 B2
(45) Date of Patent: Jan. 25, 2022

(54) METHOD AND CONTROL UNIT FOR OPERATING A BRAKING SYSTEM AND BRAKING SYSTEM

(71) Applicant: Robert Bosch GmbH, Stuttgart (DE)

(72) Inventor: Wadim Henning, Schwäbisch Hall (DE)

(73) Assignee: Robert Bosch GmbH, Stuttgart (DE)

(*) Notice: Subject to any disclaimer, the term of this patent is extended or adjusted under 35 U.S.C. 154(b) by 252 days.

(21) Appl. No.: 16/511,661

(22) Filed: Jul. 15, 2019

(65) Prior Publication Data
US 2020/0039495 A1 Feb. 6, 2020

(30) Foreign Application Priority Data

Aug. 1, 2018 (DE) .......................... 102018212848.0

(51) Int. Cl.
| | | |
|---|---|---|
| *B60T 17/22* | (2006.01) | |
| *B60T 13/16* | (2006.01) | |
| *B60T 7/12* | (2006.01) | |
| *B60T 8/1755* | (2006.01) | |

(52) U.S. Cl.
CPC .............. *B60T 17/221* (2013.01); *B60T 7/12* (2013.01); *B60T 8/1755* (2013.01); *B60T 13/167* (2013.01); *B60T 2270/306* (2013.01); *B60T 2270/86* (2013.01)

(58) Field of Classification Search
CPC .......... B60T 17/221; B60T 7/221; B60T 7/12; B60T 8/1766; B60T 13/167; B60T 2270/306; B60T 2270/86
See application file for complete search history.

(56) References Cited

U.S. PATENT DOCUMENTS

| | | | |
|---|---|---|---|
| 2013/0218407 A1* | 8/2013 | Jungbecker | B60T 7/042 701/34.4 |
| 2016/0059839 A1* | 3/2016 | Nanahara | B60T 17/221 73/39 |
| 2016/0200307 A1* | 7/2016 | Feigel | B60T 7/12 303/6.01 |
| 2018/0297574 A1* | 10/2018 | Zimmermann | B60T 13/167 |

FOREIGN PATENT DOCUMENTS

WO WO-2017063809 A1 * 4/2017 ............ B60T 8/4081

* cited by examiner

*Primary Examiner* — Melanie Torres Williams
(74) *Attorney, Agent, or Firm* — Norton Rose Fulbright US LLP; Gerard Messina

(57) ABSTRACT

A method for ascertaining a leakage in a hydraulic braking system of a motor vehicle, the braking system including at least one hydraulically actuatable wheel brake, at least one pressure generator and at least one discharge valve which is assigned to the wheel brake and actuated as a function of a driving situation of the motor vehicle to maintain driving stability, and a hydraulic volume of the braking system being monitored. It is provided that the leakage is ascertained as a function of the ascertained hydraulic volume and as a function of an actuation of the discharge valve.

13 Claims, 3 Drawing Sheets

METHOD AND CONTROL UNIT FOR OPERATING A BRAKING SYSTEM AND BRAKING SYSTEM

CROSS REFERENCE

The present application claims the benefit under 35 U.S.C. § 119 of German Patent Application No. DE 102018212848.0 filed on Aug. 1, 2018, which is expressly incorporated herein by reference in its entirety.

FIELD

The present invention relates to a method for ascertaining a leakage in a hydraulic braking system of a motor vehicle, the braking system including at least one hydraulically actuatable wheel brake, at least one pressure generator and at least one discharge valve which is assigned to the wheel brake and actuated as a function of a driving situation of the motor vehicle to maintain driving stability, and a hydraulic volume of the braking system being monitored.

The present invention furthermore relates to a control unit which is specifically configured to carry out the above-mentioned method, and to a braking system including such a control unit.

BACKGROUND INFORMATION

To be able to ensure the functional capability of a hydraulic braking system, it is important that sufficient brake fluid is always present in the braking system. For this purpose, a tank for storing and providing the brake fluid is usually available, from which the braking system draws brake fluid as needed. Braking systems, however, are usually subject to a certain leakage, as a result of which brake fluid is lost over time and therefore may no longer be available for a braking action. When using a pressure generator including a displaceable hydraulic piston for pressure generation, this, for example, causes the hydraulic piston to have to be moved increasingly further over time to be able to achieve the same pressure in the braking system. Conventionally, having knowledge of this relationship, the hydraulic volume of the braking system is monitored as a function of the actuation of the hydraulic piston. If the hydraulic piston is activated with the aid of an electric motor, for example, such as in an electric motor-assisted or -operated braking system, the position of the hydraulic piston is easily ascertainable and usable for the evaluation of the hydraulic volume. However, if a dynamic braking action is carried out, in which, for example, the hydraulic pressure is reduced or a hydraulic volume is released from the particular brake circuit by the actuation of a valve assigned to a wheel brake to quickly reduce the braking force, as is practiced in ABS systems, for example, it is no longer readily possible to correctly evaluate the hydraulic volume. Since discharge valves of the wheel brakes are switched at a very high frequency, the elasticity of the observed brake circuit changes continuously. This results in difficulties in exactly determining the existing leakage with the aid of conventional methods.

SUMMARY

An example method according to the present invention may have the advantage that the leakage is precisely ascertainable even while an, in particular, dynamic braking action is carried out, which is carried out or impaired in an automated manner, for example, by activating the motor vehicle to maintain the driving stability. This results in a higher reliability against failure of the braking system since a critical leakage is promptly and precisely detectable. According to the present invention, it is provided for this purpose that the leakage is ascertained as a function of the ascertained hydraulic volume and as a function of an actuation of the valve. By taking the valve actuation into consideration in the computation of the leakage, it is achieved that the oscillations in the braking system which occur during the valve actuation and the volume losses caused by the actuation of, in particular, a discharge valve are detected and included in the ascertainment of the actual undesirable leakage in the braking system. In this way, an intended leakage, which takes place by the actuation of, in particular, a discharge valve, in the overall volume changes of the brake fluid in the braking system may be subtracted to obtain the undesirable leakage. As a result, a simple and reliable ascertainment of the leakage in the braking system is also ensured during an active brake intervention or operation.

According to one preferred refinement of the present invention, a difference between an actual volume of a brake fluid of the braking system which is effective in the braking system and a setpoint volume predefined in the braking system is ascertained as a hydraulic volume for generating a requested braking force. The actual volume is thus the volume of the brake fluid actually present in the braking system. The setpoint volume is the volume which is set, or is to be set, in the braking system to achieve a desired braking force. When a leakage occurs, the actual volume differs from the setpoint volume, so that the actual volume is lower at the actually set setpoint volume and, as a result, the desired braking force cannot be achieved. The setpoint volume thus has to be increased. The difference between the setpoint volume and the actual volume is the relevant hydraulic volume to be taken into consideration for the leakage.

Furthermore, it is preferably provided that the effective actual volume is determined as a function of a hydraulic pressure of the brake fluid in the braking system. A hydraulic pressure in brake fluid in the braking system is continuously monitored, in particular with the aid of a pressure sensor. The effective actual volume of the brake fluid present in the braking system is preferably estimated as a function of the detected hydraulic pressure.

Furthermore, it is preferably provided that the setpoint volume is ascertained as a function of an actuation of the pressure generator, in particular as a function of a displacement of a hydraulic piston of the pressure generator. For this purpose, a rotor position sensor is preferably present, which monitors the rotor position of an electric motor driving the piston to ascertain, from the rotor position of the electric motor, the position of the piston in a pump cylinder, from which the hydraulic volume introduced by the hydraulic piston into the braking system is derivable. As an alternative, a travel sensor which monitors directly in the motion path of the piston and thus the hydraulic volume pushed into the braking system is assigned to the hydraulic piston. In both instances, a simple and reliable ascertainment of the hydraulic volume driven into the system is establishable. Since the pressure generator is actuated or driven, the hydraulic volume driven in thereby is the setpoint volume. The volume actually driven in by the hydraulic piston may differ from the setpoint volume when less brake fluid is present in the hydraulic cylinder than would theoretically be possible, for example due to leakage.

Furthermore, it is preferably provided that a volume loss in the braking system is ascertained as a function of the actuation of the at least one discharge valve, and that the leakage is determined from a difference between the ascertained hydraulic volume and the volume loss. The actuation of the valve is thus taken into consideration in the determination of the leakage as a volume loss, this volume loss being an intended volume loss which results from the actuation of the valve. Having knowledge of the dimensions and operating mode of the discharge valve, the volume loss which is achievable by the discharge valve is computable or estimatable. When the volume loss is subtracted from the ascertained hydraulic volume, the actually present leakage of the braking system is advantageously obtained.

Furthermore, it is preferably provided that the volume loss is determined as a function of a throttle cross section, the brake fluid and a pressure difference via the discharge valve at the throttle cross section. As a function of these most important parameters of the discharge valve, the intended volume loss during a valve actuation may be determined sufficiently precisely to ascertain the leakage of the braking system.

Furthermore, the volume loss is preferably ascertained individually for each wheel brake of the motor vehicle, and an overall volume loss is computed from the ascertained volume losses and used as a basis for the determination of the leakage. In this way, the overall leakage of the braking system is established in a simple manner. Advantageously, the motor vehicle includes multiple wheel brakes, preferably a particular wheel brake being assigned to each wheel of the motor vehicle.

Furthermore, it is preferably provided that the particular volume loss is ascertained with the aid of a Bernoulli/Darcy-Weisbach equation. In particular, the intended volume loss $V_{OV}$ is ascertained with the aid of the following equation:

$$V_{OV} = \Sigma_{i=1}^{4} \int_0^t q_{OV_i}(t)dt$$

The leakage $V_{leak}$ results similarly from the following equation:

$$V_{leak} = \int_0^t q_{leak}(t)dt$$

In the preceding assumption that ascertained hydraulic volume $\Delta V$ [results] from the difference between the actual volume and the target volume, it follows:

$$V_{leak} = \Delta V - V_{OV}$$

When the above-mentioned equations are used in the latter equation, it follows:

$$q_{leak} = \frac{d}{dt}\left(\Delta V - \sum_{i=1}^{4} \int_0^t q_{OV_i}(t)dt\right)$$

Hydraulic volume $\Delta V$ may be measured, and $q_{OV_i}(t)$ may be estimated when the design of the discharge valve is known.

Preferably, a sensor signal of a pressure sensor of the sensor system detecting the hydraulic pressure is filtered, in particular as a function of an instantaneous operating state of the braking system. Due to the time differentiation, the high-frequency components in the signal chain are amplified, the largest interference being visible in the pressure signal. The interference results, on the one hand, from the sensor noise of the pressure sensor itself and, on the other hand, from the switching processes of the discharge valve or discharge valves and the pressure waves impressed thereby. In the assumption that these frequencies are far off the "permanently" present leakage of the braking system, the useful signal is extracted with the aid of the preferred filtering. Selecting the filtering as a function of the instantaneous operating state results in a precise determination of the leakage. Preferably, a PT1 filter is used for filtering, in particular having a variable filter constant.

In particular, the sensor signal is filtered as a function of an instantaneous hydraulic pressure and a hydraulic pressure change, so that an advantageous useful signal is provided.

An example control unit according to the present invention is specifically configured to carry out the method according to the present invention when used as intended. This results in the aforementioned advantages.

The example braking system according to the present invention includes the control unit according to the present invention. This also results in the aforementioned advantages.

Further advantages and preferred features and feature combinations result, in particular, from the above description and from the claims. The present invention is to be described in greater detail hereafter based on the figures.

DETAILED DESCRIPTION OF EXAMPLE EMBODIMENTS

Figure 1:
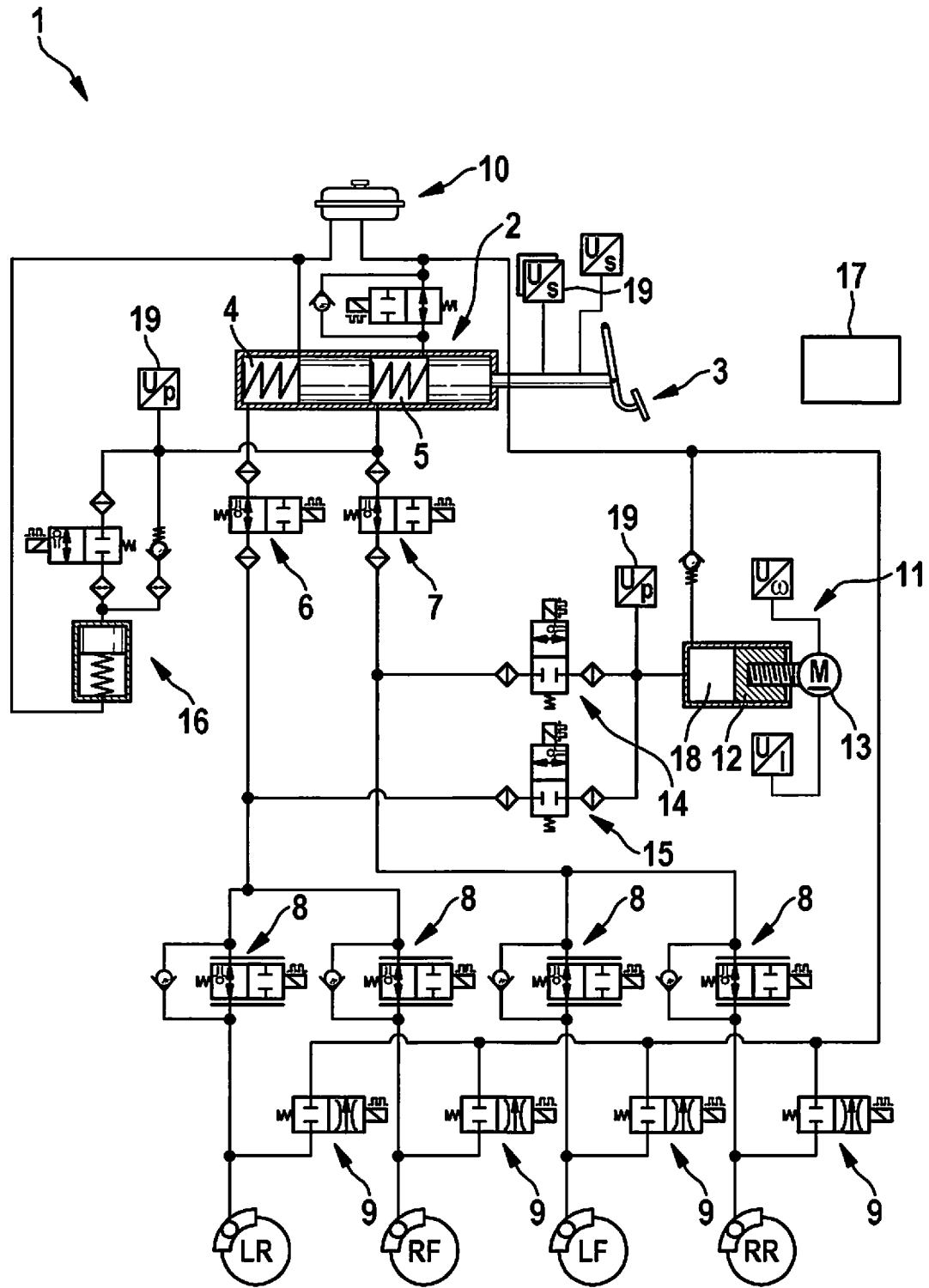
FIG. 1 shows a braking system of a motor vehicle in a simplified illustration.

FIG. 1 shows, in a simplified illustration, an advantageous braking system 1 of a motor vehicle which is not shown in greater detail here. Braking system 1 is designed as a hydraulically operating braking system and includes multiple wheel brakes LR, RF, LF and RR, which are each assigned to a wheel of the motor vehicle and are hydraulically actuatable. For this purpose, braking system 1 includes a master brake cylinder 2, which is actuatable by a driver of the motor vehicle with the aid of a brake pedal 3. In the present example, master brake cylinder 2 is designed as a tandem cylinder including two hydraulic chambers 4 and 5, a design of the braking system including a single master brake cylinder also being possible. Hydraulic chambers 4, 5 are each hydraulically connectable by a switching valve 6, 7 to a pair of wheel brakes LR, RF and LF, RR, respectively. In the present example, wheel brakes LR and RF are connectable to switching valve 6, and wheel brakes LF and RR are connectable to switching valve 7, a particular volume control valve 8 being interconnected in each case between particular switching valve 6, 7 and particular wheel brake LR, RF, LF and RR, which regulates the hydraulic pressure in each case.

With the aid of a particular discharge valve 9, wheel brake LR, RF, LF and RR is additionally hydraulically connectable in each case to a tank 10 of braking system 1 storing the brake fluid. To reduce the hydraulic pressure at the particular wheel brake, associated discharge valve 9 is actuated, for example, so that the hydraulic pressure drops until a desired braking force or until a release of the particular wheel brake overall is achieved.

Braking system 1 moreover includes an activatable pressure generator 11, which may increase the hydraulic pressure in braking system 1 independently of a brake pedal actuation. For this purpose, pressure generator 11 includes a displaceable piston 12, which delimits a pressure chamber 18 and is displaceable, in particular linearly shiftable, by an electric motor 13, to vary the hydraulic pressure in braking system 1 by varying the volume of pressure chamber 18. Pressure generator 11 is hydraulically or fluidically connected by two dedicated switching valves 14, 15 to the outlets of particular switching valve 6 or 7, so that the pressure generator is connectable to the particular pairs of wheel brakes by valves 15, 14, as master brake cylinder 2 is connectable by switching valves 6, 7.

In an automated driving state, valves 6, 7 are preferably closed and pressure generator 11 is activated to carry out a braking action as needed. Optionally, a braking action may also be carried out by pressure generator 11 as a function of a brake pedal actuation 3. Valves 6, 7 are also closed for this purpose, and optionally a braking force sensation simulator 16 is connected to master brake cylinder 2, which provides the driver at brake pedal 3 with haptic feedback corresponding to the braking force, so that the driving sensation is preserved for the driver in the customary manner, even though the braking force is actually generated by pressure generator 11 with the aid of an electric motor.

In particular when braking system 1 operates by power operation, i.e., by the activation of pressure generator 11, the monitoring of braking system 1 for a leakage loss is advantageous. For this purpose, braking system 1 advantageously includes a control unit 17, which carries out the method described hereafter.

Figure 2:
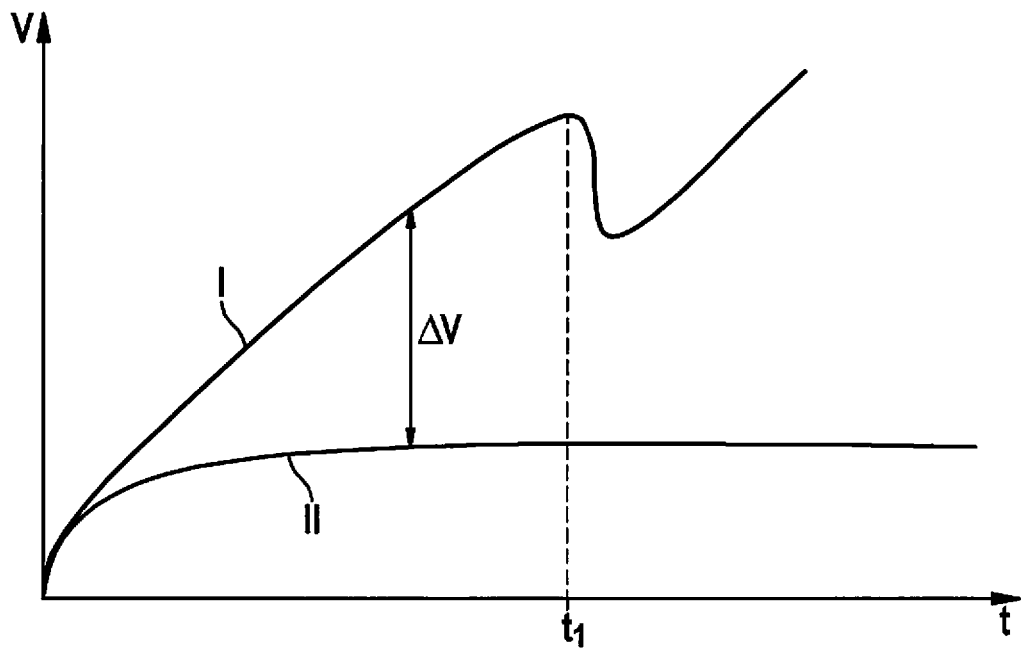
FIG. 2 shows a diagram to explain an advantageous method for ascertaining a leakage in the braking system.

The method is used to ascertain a leakage of braking system 1 during the ongoing braking operation of braking system 1. FIG. 2 illustrates the basics of the method in a diagram. FIG. 2 shows different volumes V of braking system 1 plotted against time t. A first characteristic curve I shows a typical progression of the hydraulic volume in the braking system, in a brake circuit, in which one of discharge valves 9 is actuated. Characteristic curve I shows a setpoint volume of brake fluid, which is to be introduced into the braking system by pressure generator 11 with the aid of piston 12 into braking system 1 to increase the braking force. Setpoint volume $V_{setpoint}$ is ascertained as a function of the position of hydraulic piston 12. For this purpose, in particular a rotor position sensor is assigned to electric motor 13 to calculate piston position 12 or the piston travel of hydraulic piston 12 as a function of the rotary motion of the electric motor. As an alternative, a position sensor, which detects the shift position in the hydraulic cylinder and thereby ascertains the volume in pressure chamber 18, is directly assigned to piston 12.

When hydraulic piston 12 is shifted to reduce the volume of pressure chamber 18, the corresponding volume is introduced out of pressure chamber 18 into braking system 1. However, if gaseous medium is also present in pressure chamber 18 due to leakage in braking system 1, the volume introduced into braking system 1 does not correspond to the setpoint volume which results from the shift of hydraulic piston 12. Characteristic curve I is thus the volume theoretically introduced into braking system 1 or setpoint volume $V_{setpoint}$.

At a point in time ti, piston 12 is retracted again to carry out another pumping process, resulting in a kink in characteristic curve I.

Furthermore, a characteristic curve II is plotted in the diagram representing the actual volume which is actually effective for the deceleration of the motor vehicle or for the generation of the braking force and which ultimately is a volume change in the braking system. This is the volume which is actually pushed into wheel brakes LR, RF, LF, RR to generate the requested braking force. This volume is calculated with the aid of one or multiple pressure sensor(s) 19. For this purpose, the acting hydraulic pressure and thereby the hydraulic volume introduced into braking system 1, is ascertained from an output signal of particular pressure sensor 19.

Difference $\Delta V$ of the two characteristic curves I and II results from the sum of the unknown leakage of braking system $V_{leak}$ and a volume loss $V_{OV}$, which is deliberately brought about by the actuation of discharge valves 9 to maintain the driving stability as a function of an instantaneous driving situation, for example the driving stability of the motor vehicle by quickly reducing the braking force. This results in the following relationship:

$$\Delta V = V_{leak} + V_{OV} \tag{1}$$

Leakage volume $V_{leak}$ is thus a volume which is not present in the brake circuit during the brake actuation due to the leakage which has occurred and thereby reduces the overall volume. Volume loss $V_{OV}$ is the volume which has flowed back into tank 10 (reservoir) of the braking system via discharge valves 9.

Since the volume flow is a function of the throttle cross section, the brake fluid and the pressure difference at the throttle cross section of the particular discharge valve, the following assumption is made for the volumes with the aid of the Bernoulli/Darcy-Weisbach equation:

$$V_{leak} = \int_0^t q_{leak}(t)dt \tag{2}$$

and $$V_{OV} = \Sigma_{i=1}^4 \int_0^t q_{OV_i}(t)dt \tag{3}$$

Here, i shall be understood to mean the index of individual wheel brakes LR, RF, LF, RR.

Equations (3) and (2), when inserted into equation (1), result in the following equation:

$$\Delta V = \int_0^t q_{leak}(t)dt + \Sigma_{i=1}^4 \int_0^t q_{OV_i}(t)dt \tag{4}$$

Solving equation (4) for sought-after leakage $q_{leak}$ results in the following equation:

$$q_{leak} = \frac{d}{dt}\left(\Delta V - \sum_{i=1}^4 \int_0^t q_{OV_i}(t)dt\right) \tag{5}$$

Hydraulic volume $\Delta V$ may be measured directly, and $q_{OV_i}(t)$ may be estimated according to the above-mentioned model when the cross section of discharge valve 9 is known.

Due to the time differentiation, high-frequency components of the signal chain are amplified. The interference is visible in the pressure signal. On the one hand, an interference is caused by the sensor noise of the pressure sensor itself and, on the other hand, by the switching processes of discharge valves 9 and the pressure waves impressed thereby in braking system 1. With the assumption that these frequencies are further off the "permanent" leakage of braking system 1, an advantageous useful signal of pressure sensor 19 may be extracted by suitable filtering.

Figure 3:
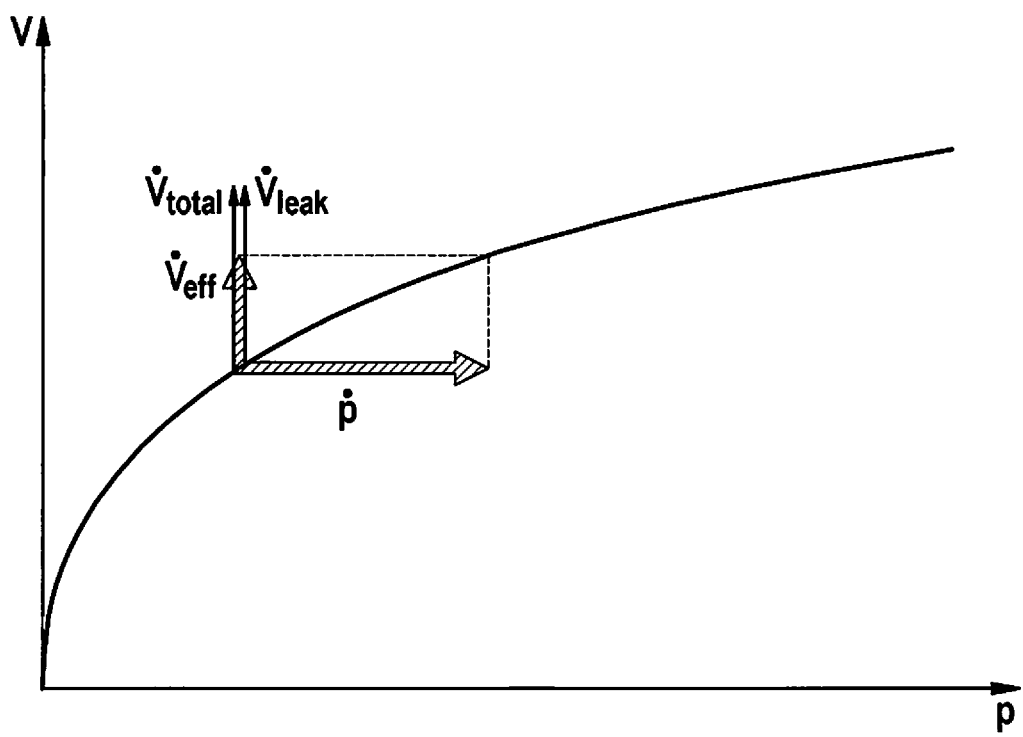
FIG. 3 shows a further diagram to explain the method.
Figure 4:
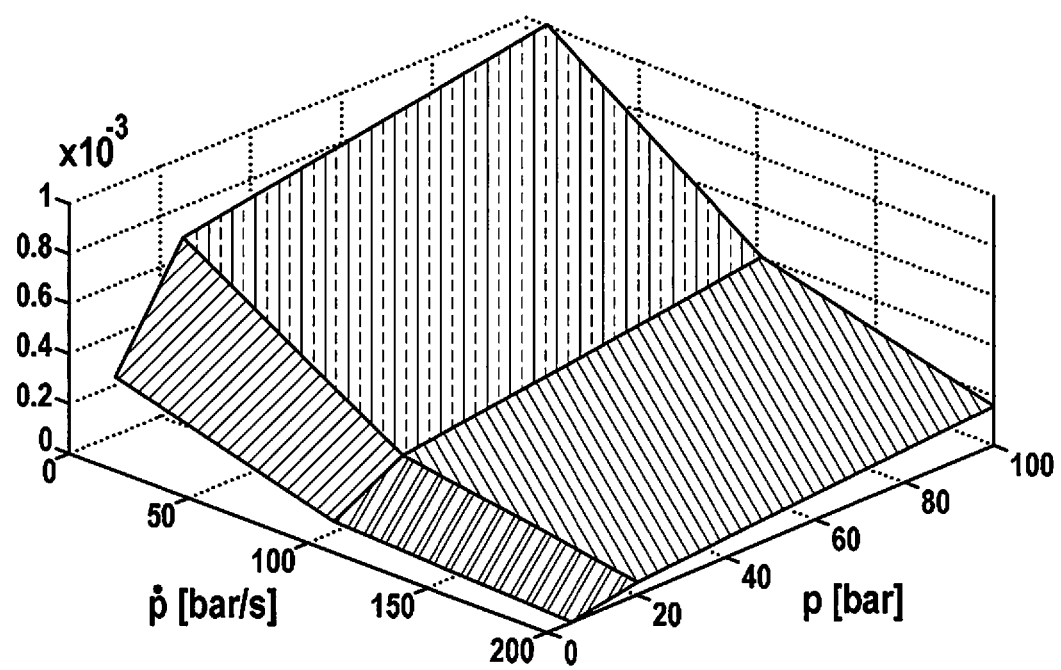
FIG. 4 shows a diagram to explain an advantageous filtering of a pressure sensor signal of the braking system.

Preferably, a PT1 filter is used or employed as the filter, which in particular has a variable filter constant, as is described, for example, hereafter:

$$y_{n+1} = y_n + K(p,\dot{p}) \cdot (u - y_n),$$

where K is considered as the filter constant as a function of the variables pressure and pressure gradient, as is shown by way of example in FIG. 4. Advantageously, filter constant K is stored in a characteristic map, as is shown in FIG. 4. Filtering is thus, in particular, situational, i.e., dependent on an instantaneous operating state of braking system 1, in particular dependent on the instantaneous hydraulic pressure and an instantaneous pressure change. This is to be explained in greater detail with the aid of FIG. 3, which in a diagram represents a typical pressure-volume characteristic of braking system 1, volume V being plotted against pressure p. This, however, is referred to as the so-called pV curve. To arrive from one point of the curve to another, or to implement vector $\dot{p}$, volume flow $\dot{V}_{\mathit{eff}}$ is needed, which effectively contributes to the deceleration of the motor vehicle. Total volume flow $\dot{V}_{\mathit{total}}$ results additively with superimposed leakage $\dot{V}_{\mathit{leak}}$. With an increasing pressure level and decreasing pressure dynamics or a decrease in a pressure change, ratio $\dot{V}_{\mathit{leak}}/\dot{V}_{\mathit{total}}$ increases, and the signal quality thus becomes more reliable. Filtering may thus be reduced. It is thus preferably provided that the filtering is reduced as the pressure level increases and the pressure dynamics decreases. One possible example of a filter coefficient is shown in FIG. 4.

For the ascertainment of the leakage, a piece of volume information is thus ascertained as the setpoint volume with the aid of the rotor position sensor and the hydraulic pressure sensor in the present example. A piece of volume information, namely the actual volume in the present example, is also ascertained from the ascertainment of the hydraulic pressure with the aid of a nominal characteristic curve. Both pieces of information are advantageously used according to the above-described principle for the ascertainment of the leakage.

This results in an advantageous establishment of the leakage of braking system 1, which may be carried out while a braking action and an intervention of the braking system or an actuation of at least one of discharge valves 9 are carried out.

What is claimed is:

1. A method for ascertaining a leakage in a hydraulic braking system of a motor vehicle, the braking system including at least one hydraulically actuatable wheel brake, at least one pressure generator, and at least one discharge valve which is (a) assigned to the at least one hydraulically actuatable wheel brake and (b) connected to a brake fluid reservoir for returning brake fluid from the at least one hydraulically actuatable wheel brake to the brake fluid reservoir for pressure reduction, the method comprising:
   ascertaining a hydraulic volume of the braking system; and
   ascertaining the leakage as a function of the ascertained hydraulic volume and as a function of the actuation of the discharge valve.

2. The method as recited in claim 1, further comprising:
   ascertaining a difference between an actual volume of a brake fluid of the braking system which is effective in the braking system and a setpoint volume predefined in the braking system as the hydraulic volume for generating a requested braking force.

3. The method as recited in claim 1, further comprising:
   determining an effective actual volume as a function of a hydraulic pressure of the brake fluid in the braking system.

4. The method as recited in claim 2, wherein the setpoint volume is ascertained as a function of a displacement of a hydraulic piston of the pressure generator.

5. The method as recited in claim 1, further comprising:
   ascertaining a volume loss in the braking system as a function of the actuation of the at least one discharge valve, wherein the leakage is ascertained from a difference between the ascertained hydraulic volume and the volume loss.

6. The method as recited in claim 5, wherein the volume loss for each of the at least one hydraulically actuatable wheel brake of the braking system is ascertained, and an overall volume loss is computed from the ascertained volume losses and used as a basis for the ascertainment of the leakage.

7. The method as recited in claim 1, further comprising:
   filtering a sensor signal of a pressure sensor of the braking system detecting the hydraulic pressure as a function of an instantaneous operational state of the braking system.

8. The method as recited in claim 7, wherein the sensor signal is filtered as a function of an instantaneous hydraulic pressure and a hydraulic pressure change.

9. The method as recites in claim 1, wherein the actuation of the discharge valve, as a function of which the leakage is ascertained, is while the motor vehicle is driving, is in response to a driving situation to maintain a driving stability of the motor vehicle during a braking operation.

10. A method for ascertaining a leakage in a hydraulic braking system of a motor vehicle, the braking system including at least one hydraulically actuatable wheel brake, at least one pressure generator, and at least one discharge valve which (a) is assigned to the at least one hydraulically actuatable wheel brake and (b) is actuatable as a function of a driving situation of the motor vehicle to maintain a driving stability, the method comprising:
    ascertaining a hydraulic volume of the braking system;
    ascertaining a volume loss in the braking system as a function of an actuation of the at least one discharge valve, a throttle cross section and a pressure difference via the at least one discharge valve at the throttle cross section; and
    ascertaining the leakage from a difference between the ascertained hydraulic volume and the ascertained volume loss.

11. A method for ascertaining a leakage in a hydraulic braking system of a motor vehicle, the braking system including at least one hydraulically actuatable wheel brake, at least one pressure generator, and at least one discharge valve which (a) is assigned to the at least one hydraulically actuatable wheel brake and (b) is actuatable as a function of a driving situation of the motor vehicle to maintain a driving stability, the method comprising:
    ascertaining a hydraulic volume of the braking system;
    ascertaining a volume loss in the braking system, with the aid of a Bernoulli/Darcy-Weisbach equation, as a function of an actuation of the at least one discharge valve; and
    ascertaining the leakage from a difference between the ascertained hydraulic volume and the ascertained volume loss.

12. A control unit for operating a braking system of a motor vehicle, the braking system including at least one hydraulically actuatable wheel brake, at least one pressure generator, and at least one discharge valve (a) assigned to the at least one hydraulically actuatable wheel brake and (b) connected to a brake fluid reservoir for returning brake fluid from the at least one hydraulically actuatable wheel brake to the brake fluid reservoir for pressure reduction, the control unit being configured to ascertain a leakage of the brake fluid of the braking system, the control unit configured to:
  ascertain a hydraulic volume of the braking system; and
  ascertain the leakage as a function of the ascertained hydraulic volume and as a function of an actuation of the discharge valve.

13. A braking system for a motor vehicle, comprising:
  at least one hydraulically actuatable wheel brake;
  at least one pressure generator;
  at least one discharge valve assigned to the at least one hydraulically actuatable wheel brake and connected to a brake fluid reservoir for returning brake fluid from the at least one hydraulically actuatable wheel brake to the brake fluid reservoir for pressure reduction; and
  a control unit being configured to ascertain a hydraulic volume of the braking system and ascertain a leakage of the brake fluid as a function of the ascertained hydraulic volume and as a function of an actuation of the discharge valve.

* * * * *